(12) United States Patent
Churay et al.

(10) Patent No.: US 12,296,854 B2
(45) Date of Patent: May 13, 2025

(54) VEHICLE SYSTEMS AND METHODS FOR AUTONOMOUS OPERATION USING DRIVER ATTENTION

(71) Applicant: GM GLOBAL TECHNOLOGY OPERATIONS LLC, Detroit, MI (US)

(72) Inventors: Christopher Michael Churay, Farmington Hills, MI (US); Paul A Adam, Milford, MI (US); Reza Zarringhalam, Whitby (CA); Milad Jalaliyazdi, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 365 days.

(21) Appl. No.: 17/813,721

(22) Filed: Jul. 20, 2022

(65) Prior Publication Data

US 2024/0025450 A1    Jan. 25, 2024

(51) Int. Cl.
*B60W 60/00*    (2020.01)
*B60W 30/18*    (2012.01)
*B60W 40/08*    (2012.01)

(52) U.S. Cl.
CPC .. *B60W 60/0025* (2020.02); *B60W 30/18163* (2013.01); *B60W 40/08* (2013.01); *B60W 2420/403* (2013.01); *B60W 2540/225* (2020.02)

(58) Field of Classification Search
CPC ....... B60W 60/0025; B60W 30/18163; B60W 40/08; B60W 2420/403; B60W 2540/225; B60W 60/00; B60W 40/09
See application file for complete search history.

(56) References Cited

U.S. PATENT DOCUMENTS

| 2010/0033333 | A1* | 2/2010 | Victor | A61B 5/7264 340/576 |
| 2020/0172106 | A1* | 6/2020 | O'Dea | B60W 30/18163 |
| 2022/0219701 | A1* | 7/2022 | Chikamori | B60W 30/182 |

* cited by examiner

*Primary Examiner* — Anne Marie Antonucci
*Assistant Examiner* — Jewel Ashley Kuntz
(74) *Attorney, Agent, or Firm* — Lorenz & Kopf LLP (57) ABSTRACT

Vehicles and related systems and methods are provided for controlling a vehicle in an autonomous operating mode. One method involves a controller associated with a vehicle identifying a visual attention state associated with a driver of the vehicle based at least in part on output of an imaging device onboard the vehicle, determining, based at least in part on the visual attention state, a driver lane preference corresponding to an adjacent lane in a visual attention direction relative to a current lane of travel for the vehicle, adjusting a priority associated with the adjacent lane corresponding to the driver lane preference and autonomously operating one or more actuators onboard the vehicle to initiate maneuvering the vehicle from the current lane in a manner that is influenced by the adjusted priority associated with the adjacent lane.

20 Claims, 6 Drawing Sheets

VEHICLE SYSTEMS AND METHODS FOR AUTONOMOUS OPERATION USING DRIVER ATTENTION

INTRODUCTION

The technical field generally relates to vehicle systems and more particularly relates to autonomous operation of a vehicle using the visual attention of a driver to increase confidence in executing a maneuver.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Due to the sheer number of different variables in a real-world environment, an autonomous vehicle control system could encounter an environment or scenario where assistance may be desired. For example, traffic, road conditions and other obstacles or scenarios can be encountered that impair autonomous operation. In lower-level automation systems (e.g., Level Three or below), such scenarios may require a driver or other vehicle occupant manually control or operate the vehicle in some instances, which introduces a burden on a rider that is somewhat contrary to the intent of the automation. Accordingly, it is desirable to provide vehicle control systems and methods that are capable of autonomously resolving scenarios and arriving at a satisfactory solution for how to autonomously operate the vehicle with reduced burden on the driver to improve the user experience. Other desirable features and characteristics of the present invention will become apparent from the subsequent detailed description and the appended claims, taken in conjunction with the accompanying drawings and the foregoing technical field and background.

SUMMARY

Apparatus for a vehicle and related methods for controlling the vehicle in an autonomous operating mode are provided. One method of controlling a vehicle in an autonomous operating mode involves a controller associated with the vehicle identifying a visual attention state associated with a driver of the vehicle based at least in part on output of an imaging device onboard the vehicle, determining, based at least in part on the visual attention state, a driver lane preference corresponding to an adjacent lane in a visual attention direction relative to a current lane of travel for the vehicle, the visual attention direction corresponding to the visual attention state, adjusting a priority associated with the adjacent lane corresponding to the driver lane preference, and autonomously operating one or more actuators onboard the vehicle to initiate maneuvering the vehicle from the current lane in a manner that is influenced by the adjusted priority associated with the adjacent lane.

In one aspect, identifying the visual attention state involves identifying visual attention of the driver directed to a region associated with a side of the current lane of travel in the visual attention direction, determining the driver lane preference involves identifying the adjacent lane on the side of the current lane of travel in the visual attention direction as a preferred lane, adjusting the priority involves increasing the priority associated with the adjacent lane, resulting in an increased priority associated with the adjacent lane, and autonomously operating the one or more actuators involves autonomously operating the one or more actuators to initiate a lane change from the current lane to the adjacent lane in accordance with the increased priority. In a further aspect, identifying the visual attention of the driver directed to the region associated with the side of the current lane of travel involves identifying the visual attention of the driver is directed to a mirror on the side of the vehicle in the visual attention direction. In another aspect, autonomously operating the one or more actuators to initiate the lane change from the current lane to the adjacent lane in accordance with the increased priority involves providing an indication to a motion planning module to generate a motion plan to execute a pending lane change in the visual attention direction.

In one aspect, adjusting the priority involves decreasing the priority associated with the adjacent lane when the visual attention direction corresponds to a first side of the current lane opposite a second side of the current lane corresponding to the adjacent lane, resulting in a decreased priority associated with the adjacent lane and autonomously operating the one or more actuators involves autonomously operating the one or more actuators to delay a lane change from the current lane to the adjacent lane in accordance with the decreased priority. In another aspect, adjusting the priority involves decreasing the priority associated with the adjacent lane when the visual attention direction corresponds to a first side of the current lane opposite a second side of the current lane corresponding to the adjacent lane, resulting in a decreased priority associated with the adjacent lane and autonomously operating the one or more actuators involves autonomously operating the one or more actuators to initiate a lane change from the current lane to a second adjacent lane on the first side of the current lane in accordance with the decreased priority associated with the adjacent lane. In another aspect, autonomously operating the one or more actuators involves autonomously operating the one or more actuators to cancel or delay a pending lane change. In another aspect, determining the visual attention state involves determining at least one of a frequency and a duration of visual attention in the visual attention direction over a preceding window of time, determining the driver lane preference involves determining the adjacent lane is a preferred lane when the at least one of the at least one of the frequency and the duration of visual attention in the visual attention direction over the preceding window of time is greater than a threshold, and adjusting the priority involves increasing the priority associated with the adjacent lane in response to determining the adjacent lane is the preferred lane, resulting in an increased priority associated with the adjacent lane.

In one or more implementations, a vehicle is provided that includes an imaging device, one or more actuators onboard the vehicle, and a controller coupled to the imaging device and the one or more actuators. The controller, by a processor, identifies a visual attention state associated with a driver of the vehicle based at least in part on output of the imaging device, determines a driver lane preference corresponding to an adjacent lane in a visual attention direction relative to a current lane of travel for the vehicle corresponding to the visual attention state, adjusts a priority associated with the adjacent lane corresponding to the driver lane preference, and autonomously operates the one or more actuators to initiate maneuvering the vehicle from the current lane in a manner that is influenced by the adjusted priority associated with the adjacent lane. In one aspect, the imaging device includes a camera oriented to capture imagery of the driver when the driver is operating the vehicle. In another aspect, the visual attention state is visual attention of the driver directed to a region associated with a side of the current lane of travel in the visual attention direction and the driver lane preference is the adjacent lane on the side of the current lane of travel in the visual attention direction. In one or more implementations, the region is a mirror on the side of the vehicle in the visual attention direction.

Also provided is a non-transitory computer-readable medium having stored thereon executable instructions in one or more implementations. The instructions, when executed by a processor, cause the processor to identify a visual attention state associated with a driver of a vehicle based at least in part on output of an imaging device onboard the vehicle, determine, based at least in part on the visual attention state, a driver lane preference corresponding to an adjacent lane in a visual attention direction relative to a current lane of travel for the vehicle corresponding to the visual attention state, adjust a priority associated with the adjacent lane corresponding to the driver lane preference, and autonomously operate one or more actuators onboard the vehicle to initiate maneuvering the vehicle from the current lane in a manner that is influenced by the adjusted priority associated with the adjacent lane.

In one aspect, identifying the visual attention state involves identifying visual attention of the driver directed to a region associated with a side of the current lane of travel in the visual attention direction, determining the driver lane preference involves identifying the adjacent lane on the side of the current lane of travel in the visual attention direction as a preferred lane, adjusting the priority involves increasing the priority associated with the adjacent lane, and autonomously operating the one or more actuators involves autonomously operating the one or more actuators to initiate a lane change from the current lane to the adjacent lane in accordance with the increased priority. In one or more implementations, the region is a mirror on the side of the vehicle in the visual attention direction.

In another aspect, autonomously operating the one or more actuators to initiate a lane change from the current lane to the adjacent lane in accordance with the adjusted priority involves providing an indication to a motion planning module to generate a motion plan to execute a pending lane change in the visual attention direction. In yet another aspect, adjusting the priority involves decreasing the priority associated with the adjacent lane when the visual attention direction corresponds to a first side of the current lane opposite a second side of the current lane corresponding to the adjacent lane and autonomously operating the one or more actuators involves autonomously operating the one or more actuators to delay a lane change from the current lane to the adjacent lane in accordance with the decreased priority. In another aspect, adjusting the priority involves decreasing the priority associated with the adjacent lane when the visual attention direction corresponds to a first side of the current lane opposite a second side of the current lane corresponding to the adjacent lane and autonomously operating the one or more actuators involves autonomously operating the one or more actuators to initiate a lane change from the current lane to a second adjacent lane on the first side of the current lane in accordance with the decreased priority associated with the adjacent lane. In another aspect, autonomously operating the one or more actuators involves autonomously operating the one or more actuators to cancel or delay a pending lane change. In yet another aspect, determining the visual attention state involves determining at least one of a frequency and a duration of visual attention in the visual attention direction over a preceding window of time, determining the driver lane preference involves determining the adjacent lane is a preferred lane when the at least one of the at least one of the frequency and the duration of visual attention in the visual attention direction over the preceding window of time is greater than a threshold, and adjusting the priority involves increasing the priority associated with the adjacent lane in response to determining the adjacent lane is the preferred lane, resulting in an increased priority associated with the adjacent lane.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
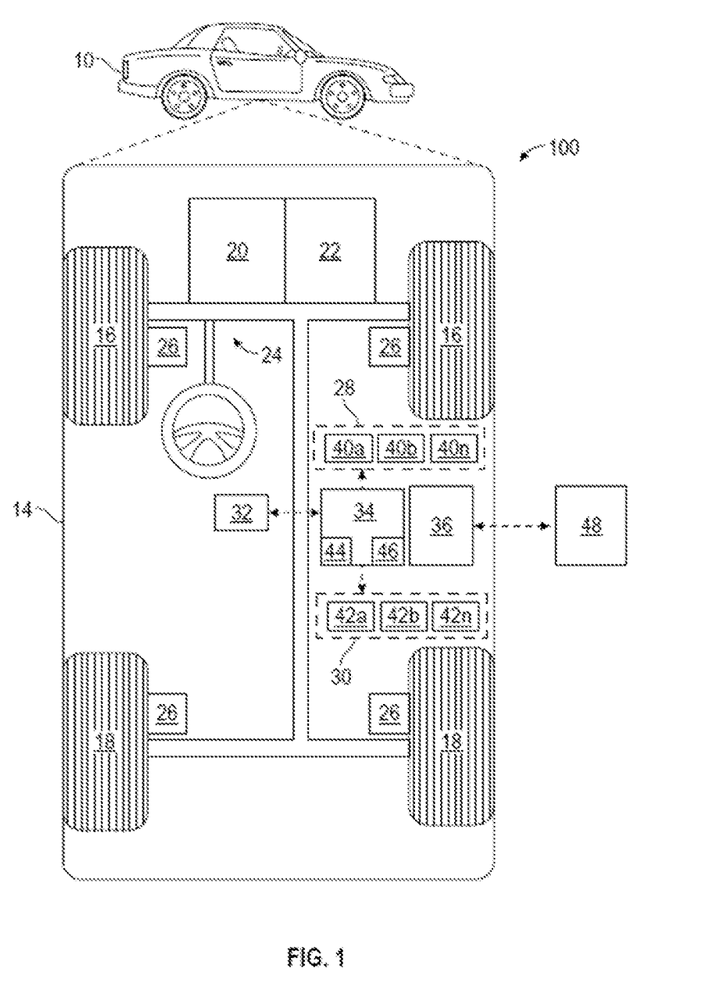
FIG. 1 is a block diagram illustrating an autonomous vehicle control system for a vehicle in accordance with various implementations.

Referring now to FIG. 1, in accordance with one or more implementations, an autonomous vehicle control system 100 determines a plan for autonomously operating a vehicle 10 along a route in a manner that accounts for objects or obstacles detected by onboard sensors 28, 40, as described in greater detail below. In this regard, a control module onboard the vehicle 10 calibrates different types of onboard sensors 28, 40 with respect to one another and/or the vehicle 10, thereby allowing data from those different types of onboard sensors 28, 40 to be spatially associated or otherwise with one another based on the calibration for purposes of object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary implementations, the vehicle 10 is an autonomous vehicle or is otherwise configured to support one or more autonomous operating modes, and the control system 100 is incorporated into the vehicle 10 (hereinafter referred to as the vehicle 10). The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various implementations, the transmission system 22 may include a step-ratio automatic transmission, a continuously-variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, implementations of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various implementations, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below. In one or more exemplary implementations, the data storage element 46 maintains a lookup table of lateral planning information that may be utilized to determine corresponding lateral reference trajectories for maneuvering laterally into an adjacent lane, with the lateral planning information and resulting reference lateral trajectory being utilized or otherwise referenced by the processor 44 to determine commands for autonomously operating the vehicle 10 when the normal vehicle guidance or control scheme supported by the processor 44 encounters a deadline or other temporal constraint for a time-sensitive lateral maneuver to avoid having to solve for a commanded vehicle path within a limited period of time.

Still referring to FIG. 1, in exemplary implementations, the communication system 36 is configured to wirelessly communicate information to and from other entities 48 over a communication network, such as but not limited to, other vehicles ("V2V" communication) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
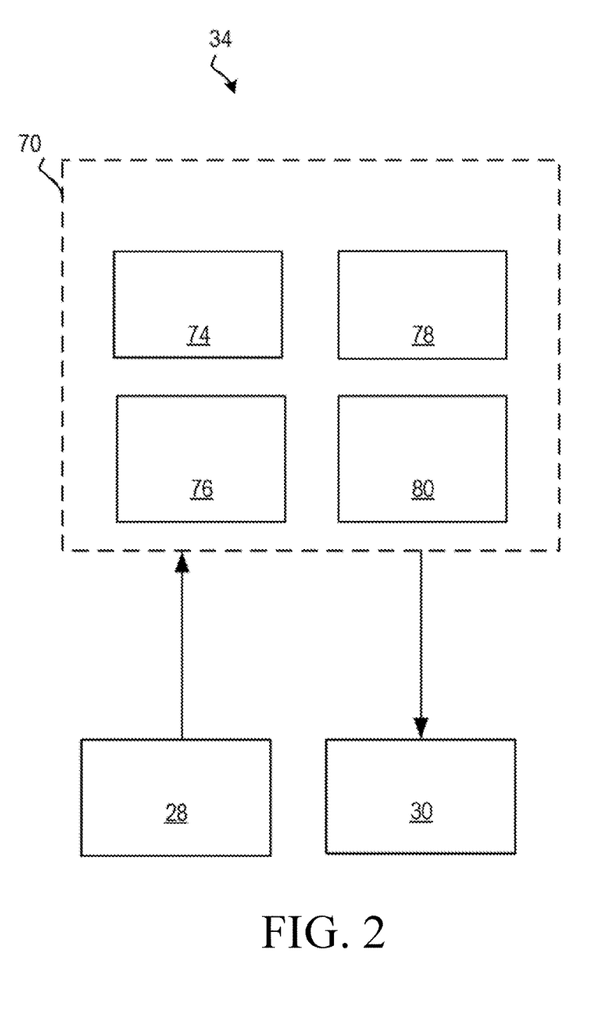
FIG. 2 is a block diagram of an automated driving system (ADS) suitable for implementation by the autonomous vehicle control system of the vehicle of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors. In one or more exemplary implementations described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

In an exemplary implementation, the longitudinal solver module receives or otherwise obtains the current or instantaneous pose of the vehicle, which includes the current position or location of the vehicle, the current orientation of the vehicle, the current speed or velocity of the vehicle, and the current acceleration of the vehicle. Using the current position or location of the vehicle, the longitudinal solver module also retrieves or otherwise obtains route information which includes information about the route the vehicle is traveling along given the current pose and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). The route information may be obtained from, for example, an onboard data storage element 32, an online database, or other entity. In one or more implementations, the lateral route information may include the planned lateral path command output by the lateral solver module, where the longitudinal and lateral solver modules iteratively derive an optimal travel plan along the route.

The longitudinal solver module also receives or otherwise obtains the current obstacle data relevant to the route and current pose of the vehicle, which may include, for example, the location or position, size, orientation or heading, speed, acceleration, and other characteristics of objects or obstacles in a vicinity of the vehicle or the future route. The longitudinal solver module also receives or otherwise obtains longitudinal vehicle constraint data which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data may be specific to each particular vehicle and may be obtained from an onboard data storage element 32 or from a networked database or other entity 48, 52, 54. In some implementations, the longitudinal vehicle constraint data may be calculated or otherwise determined dynamically or substantially in real-time based on the current mass of the vehicle, the current amount of fuel onboard the vehicle, historical or recent performance of the vehicle, and/or potentially other factors. In one or more implementations, the longitudinal vehicle constraint data is calculated or determined in relation to the lateral path, the lateral vehicle constraint data, and/or determinations made by the lateral solver module. For example, the maximum longitudinal speed may be constrained at a particular location by the path curvature and the maximum lateral acceleration by calculating the maximum longitudinal speed as a function of the path curvature and the maximum lateral acceleration (which itself could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding collisions with objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid collisions, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, the lateral solver module receives or otherwise obtains the current vehicle pose and the relevant route information and obstacle data for determining a lateral travel plan solution within the prediction horizon. The lateral solver module also receives or otherwise obtains lateral vehicle constraint data which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data may also be specific to each particular vehicle and may be obtained from an onboard data storage element 32 or from a networked database or other entity 48, 52, 54. The lateral solver module may also receive or otherwise obtain user-specific lateral ride preference information which includes, for example, user-specific values or settings for the steering rate (e.g., a maximum rate of change for the steering angle, a maximum acceleration of the steering angle, and/or the like), the lateral jerk, and the like. The lateral ride preference information may also include user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding collisions with objects or obstacles.

During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding collisions by varying one or more of the vehicle's velocity, acceleration/deceleration (longitudinally and/or laterally), jerk (longitudinally and/or laterally), steering angle, and steering angle rate of change. The longitudinal travel plan output by the motion planning module includes a sequence of planned velocity and acceleration commands with respect to time for operating the vehicle within the longitudinal prediction horizon (e.g., a velocity plan for the next 12 seconds), and similarly, the lateral travel plan output by the motion planning module includes a sequence of planned steering angles and steering rates with respect to distance or position for steering the vehicle within the lateral prediction horizon while operating in accordance with the longitudinal travel plan (e.g., a steering plan for the next 50 meters). The longitudinal and lateral plan outputs are provided to the vehicle control system 80, which may utilize vehicle localization information and employs its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

In exemplary implementations, the guidance system 78 supports a hands-free autonomous operating mode that controls steering, acceleration and braking while it is enabled and operating to provide lane centering while attempting to maintain a driver-selected speed and/or following distance (or gap time) relative to other vehicles using the current sensor data (or obstacle data) provided by the sensor fusion system 74 and the current vehicle pose provided by the positioning system 76. In the autonomous operating mode, the guidance system 78 includes or otherwise implements a lane change coordinator that analyzes route information (if available) in addition to data or other information from the sensor fusion system 74, the positioning system 76 and potentially other modules or systems to determine whether or not to initiate and execute a lane change from a current lane of travel to an adjacent lane of travel, for example, based on presence of slower moving traffic within the current lane of travel ahead of the vehicle (e.g., to overtake or pass another vehicle), whether or not the current lane is ending or merging into an adjacent lane, whether a lane change is required to maintain travel along the desired route, and/or the like. In this regard, the lane change coordinator may automatically determine when to initiate a lane change and automatically configure the lateral solver module and/or the motion planning module to generate a corresponding lateral plan to change lanes in the desired manner and provide the lateral plan to the vehicle control system 80, which automatically generates corresponding control signals for autonomously controlling the vehicle actuators 30 to maneuver the vehicle 10 and execute the lane change.

Figure 3:
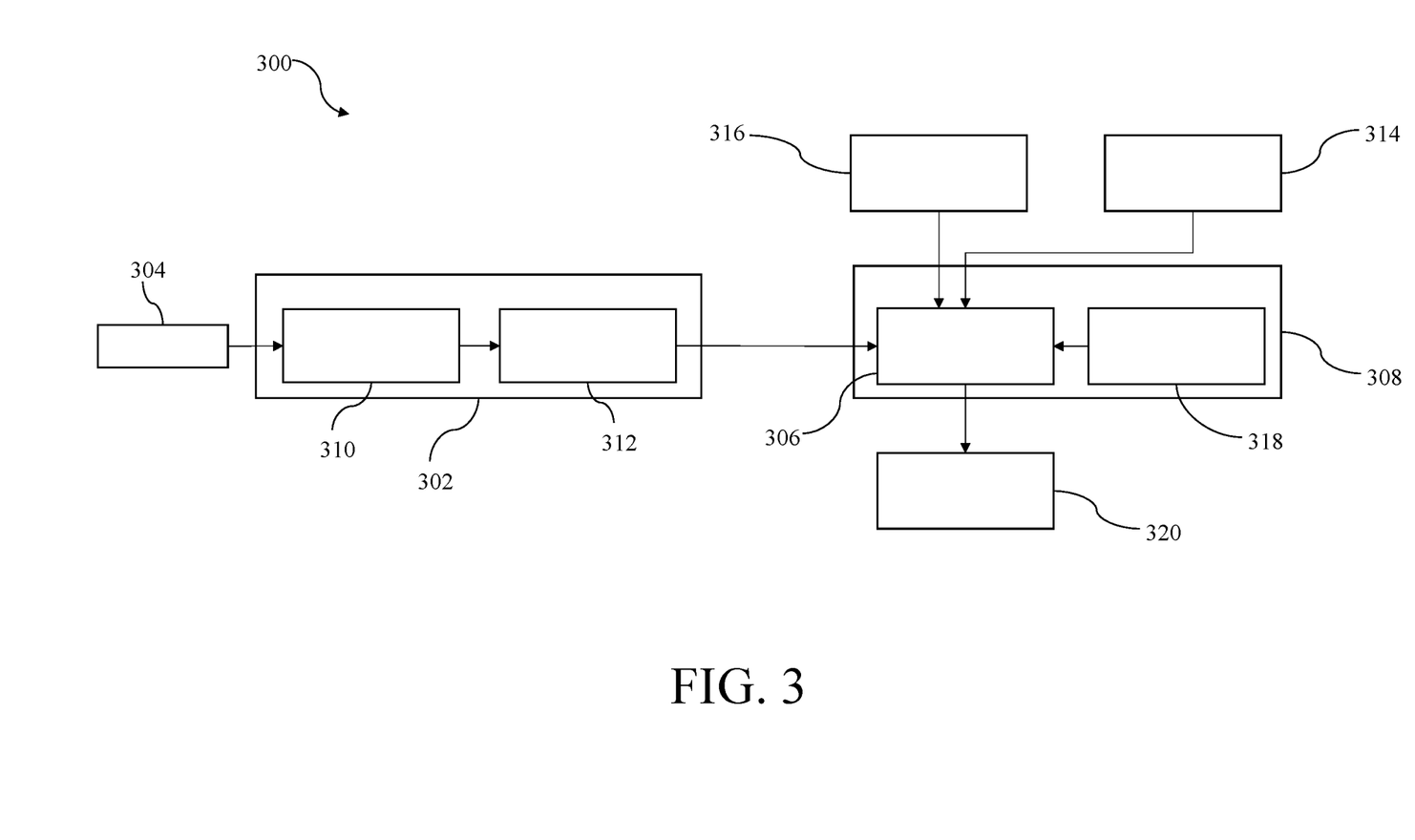
FIG. 3 depicts a block diagram of an autonomous vehicle control system that includes a driver monitoring system suitable for use with the ADS of FIG. 2 in the autonomous vehicle control system of FIG. 1 according to one or more aspects described herein.

Referring now to FIG. 3, with continued reference to FIGS. 1-2, in exemplary implementations, a vehicle control system 300 includes a driver monitoring system 302 that analyzes image data output by an imaging device 304 to classify or otherwise determine a visual attention state associated with a driver of a vehicle and analyzes the driver's visual attention state to identify or otherwise determine whether the driver has a lane preference for an alternative lane to the current lane of travel. When the driver monitoring system 302 determines a driver lane preference exists, an adjacent lane in the direction of the driver's visual attention is identified or otherwise designated as a preferred lane and a corresponding indication of the preferred lane is provided to a lane change coordination system 306 at a guidance system 308 (e.g., guidance system 78) to influence lateral maneuvering the vehicle from the current lane of travel.

In exemplary implementations, the imaging device 304 is realized as a video camera that is located in the interior cabin or passenger compartment of a vehicle and positioned or otherwise oriented to face the driver's seat to capture video or imagery of the driver during operation of the vehicle. For example, the imaging device 304 may be integrated or otherwise incorporated into a steering wheel such that the field of view or line of sight of the imaging device 304 is aligned with the central axis of the steering wheel to capture images of the driver's face or head when the driver is seated in the driver's seat and looking forward out the front windshield of the vehicle. That said, it should be appreciated the subject matter described herein is not limited to any particular type of imaging device 304 or any particular arrangement, configuration or packaging of the imaging device 304.

In exemplary implementations, the driver monitoring system 302 is implemented or otherwise realized using at least one processor and a computer-readable storage device or media capable of storing data or executable instructions that cause the at least one processor to execute, generate or otherwise provide a visual attention classification module 310 and a visual lane prioritization module 312. The visual attention classification module 310 is configured to receive the video or other image data output by the imaging device 304 and analyzes the image data to identify or otherwise determine the direction in which the driver's head or eyes are looking. It should be appreciated that any number of different image and video processing techniques may be utilized to detect or otherwise identify the orientation of the driver's line of sight (or the focal point thereof) which are not germane to this disclosure, and the subject matter described herein is not limited to any particular manner or technique for estimating or determining the orientation of a driver's line of sight using captured image data.

In one or more exemplary implementations, the visual attention classification module 310 analyzes the direction or orientation of the driver's line of sight with respect to the imaging device 304 to classify or otherwise assign the driver's visual attention into one of a plurality of defined visual attention states. For example, when the direction or orientation of the driver's line of sight indicates that the driver's visual attention is directed towards or otherwise encompassed by a region on the driver's side of the vehicle that includes the driver's side mirror and the driver's side window, the visual attention classification module 310 may determine that the driver's visual attention direction corresponds to the driver's side of the vehicle (or left side of the vehicle in the United States). Conversely, when the direction or orientation of the driver's line of sight indicates that the driver's visual attention is directed towards or otherwise encompassed by a region on the opposing passenger side of the vehicle that includes the passenger side mirror and the passenger side window, the visual attention classification module 310 may determine that the driver's visual attention direction corresponds to the passenger side of the vehicle (or right side of the vehicle in the United States). Additionally, other regions for the driver's line of sight or focal point may be classified into different visual attention states, for example, when the direction or orientation of the driver's line of sight indicates that the driver's visual attention is directed towards or otherwise encompassed by a region that includes the rear view mirror, the visual attention classification module 310 may determine that the driver's visual attention direction corresponds to the rear of the vehicle, while other forward-looking regions (e.g., the dashboard, the center console, or the like) may be assigned different visual attention classifications.

The visual lane prioritization module 312 is coupled to the visual attention classification module 310 to receive indicia of the driver's visual attention state and dynamically determine the driver's lane preference and dynamically adjust priorities associated with the different potential lanes of travel to reflect the driver's current lane preference substantially in real-time. For example, the visual lane prioritization module 312 may monitor, track or otherwise determine the frequency or number of times that a particular visual attention state occurred over a preceding window of time and/or a duration of time for which a particular visual attention state occurred over a preceding window of time. In this regard, when the driver's visual attention state corresponding to the driver's visual attention direction to a particular side of the vehicle occurs greater than a threshold number of times and/or for greater than a threshold duration of time over a preceding monitoring window, the visual lane prioritization module 312 may identify the adjacent lane on that side of the vehicle corresponding to the driver's visual attention direction as the driver's preferred lane of travel and automatically increase a priority assigned to the adjacent lane in that direction by virtue of the driver's visual attention being directed towards that lane. At the same time, the visual lane prioritization module 312 may automatically decrease the priority assigned to the opposing adjacent lane on the other side of the vehicle opposite the driver's visual attention direction to reflect the driver's visual attention being directed away from that lane.

Still referring to FIG. 3, the visual lane prioritization module 312 outputs or otherwise provides indicia of the current visual attention state and corresponding lane prioritizations or preferences to the lane change coordination system 306 at the guidance system 308. The lane change coordination system 306 utilizes the current visual attention state for the driver and the lane prioritizations influenced by the driver's visual attention state over a preceding monitoring window to determine whether or not to initiate a lane change or maintain the vehicle in the current lane of travel. In this regard, the driver's visual attention state and lane prioritizations may be utilized to augment automated lane change determinations and increase the confidence that the automated lane change is desired or not desired based on whether or not the driver's visual attention state and/or lane preferences are aligned with the automated lane change determination based on other variables. For example, as described above, the lane change coordination system 306 of the guidance system 308 may receive data or other information indicative of neighboring traffic or other obstacles from a sensor system 314 associated with the vehicle (e.g., sensor fusion system 74) to automatically determine whether or not the vehicle should change lanes to pass or otherwise overtake a slower moving vehicle in front of the host vehicle to maintain a desired set speed (or cruise speed) that may be defined or otherwise desired by the driver. Additionally, the lane change coordination system 306 may receive data or information indicative of the current vehicle pose from a positioning system 316 (e.g., positioning system 76) which may be utilized in conjunction with route information 318 (if available) to determine whether or not the vehicle should change lanes to maintain travel along a desired route.

In one or more exemplary implementations, when the lane change coordination system 306 utilizes the current visual attention state for the driver to further increase the priority associated with executing an automated lane change when the driver's visual attention direction corresponds to the same side of the vehicle as the automated lane change. For example, based on sensor data from the sensor system 314 indicative of slower moving vehicles in the path ahead of the host vehicle that are within a threshold distance of the host vehicle, the lane change coordination system 306 may automatically determine to initiate a lane change from the current lane of travel to an adjacent lane of travel on the driver's side of the host vehicle. When the driver's visual attention direction corresponds to the driver's side of the host vehicle and/or the adjacent lane of travel on the driver's side of the host vehicle is assigned a higher priority by the visual lane prioritization module 312, the lane change coordination system 306 determines that the driver's visual attention direction and the automated lane change direction are aligned, and accordingly, provides a command, signal, or other instruction to the motion planning module (e.g., by setting a hurry up flag bit to a particular value) to expedite implementation of the automated lane change from the current lane to the adjacent lane of travel on the driver's side. In response, the motion planning module may automatically determine a motion plan configured to cause the vehicle to maneuver laterally from the current lane of travel to the adjacent lane of travel on the driver's side and provide the motion plan (or corresponding command signals) to a vehicle control system 320 (e.g., vehicle control system 80) which autonomously operates one or more actuators onboard the vehicle to initiate maneuvering the vehicle from the current lane to the adjacent lane of travel on the driver's side. In this regard, when the lane change coordination system 306 indicates a desire to expedite a lane change based on the driver's visual attention confirming the automated lane change, in some implementations, the guidance system 308 and/or the vehicle control system 320 may automatically initiate autonomous operation to change lanes without waiting for other confirmation from the driver or providing user notifications of a pending lane change because the driver's visual attention is consistent or otherwise aligned with the automated lane change.

On the other hand, in other scenarios, the lane change coordination system 306 may utilize the current visual attention state for the driver to alter, delay, cancel, or otherwise decrease the priority associated with executing an automated lane change when the driver's visual attention direction does not match or otherwise correspond to the same side of the vehicle as the automated lane change. For example, when the lane change coordination system 306 automatically determines to initiate an automated lane change from the current lane of travel to an adjacent lane of travel on the driver's side of the host vehicle but the driver's visual attention direction corresponds to the opposing passenger side of the vehicle and/or the adjacent lane of travel on the passenger side of the host vehicle is assigned a higher priority by the visual lane prioritization module 312, the lane change coordination system 306 determines that the driver's visual attention direction and the automated lane change direction are mismatched or misaligned. In some implementations, the lane change coordination system 306 utilizes the driver's visual attention direction to override or otherwise augment the automated lane change to the preferred or higher priority lane derived from the driver's visual attention state, for example, by modifying the automated lane change to the adjacent lane of travel on the passenger side of the host vehicle instead of the driver side lane. In other implementations, the lane change coordination system 306 may decrease the priority associated with the automated lane change or otherwise delay execution of the automated lane change, for example, by requiring driver confirmation of the pending automated lane change to the driver's side of the host vehicle when the driver's attention state is not directed to or aligned with the driver's side of the host vehicle.

In some implementations, when a pending automated lane change does not currently exist, the lane change coordination system 306 utilizes the driver's visual attention state and corresponding lane prioritizations or preferences to influence automated lane changes that may be subsequently determined based on neighboring traffic, route information, and/or the like. For example, when the driver's visual attention state indicates that the driver's visual attention is preferentially directed towards a passenger side of the vehicle, the priority associated with the adjacent lane on the passenger side of the vehicle may be increased such that in response to a subsequent determination to initiate an automated lane change to pass or overtake a slower moving vehicle ahead of the host vehicle, the lane change coordination system 306 may determine to initiate an automated lane change from the current lane of travel into the adjacent lane on the passenger side of the vehicle rather than defaulting to an automated lane change to the adjacent lane on the driver's side of the vehicle. In this regard, the driver's visual attention state and corresponding lane preferences may be utilized to dynamically increase or decrease the relative priority of different potential lanes of travel and/or dynamically increase or decrease different timers or thresholds for initiating an automated lane change from the current lane of travel.

For example, if the direction of the driver's visual attention is to a particular side of the vehicle for more than a threshold duration of time and/or the driver's visual attention is directed to that particular side of the vehicle more than a threshold number of times during a preceding monitoring window, the lane change coordination system 306 may progressively increase the priority associated with the adjacent lane on that side of the vehicle and/or progressively decrease the timers or thresholds for initiating a lane change to that side of the vehicle to increase the likelihood of an automated lane change from the current lane of travel to the adjacent lane on that side of the vehicle being initiated. In this regard, some implementations of the lane change coordination system 306 utilize the driver's visual attention state and corresponding visual lane preferences or prioritizations as input variables that fuse or otherwise combine the output of the driver monitoring system 302 with outputs from other onboard systems or components that are analyzing different aspects of the vehicle operation and surrounding environment and provide corresponding lane preferences or prioritizations to result at a final determination of whether to initiate an automated lane change in a particular direction as a weighted combination of the different inputs.

It should be noted that FIG. 3 depicts a simplified representation of the vehicle control system 300 for purposes of explanation and is not intended to be limiting. In this regard, although FIG. 3 depicts the driver monitoring system 302 as a separate or standalone system that is distinct from the guidance system 308, in other implementations, the driver monitoring system 302 (or portions thereof) may be incorporated, integrated or otherwise implemented in connection with the guidance system 308 or another system onboard a vehicle. For example, the visual lane prioritization module 312 may be implemented by or at the guidance system 308 and/or the visual attention classification module 310 may be implemented by or at the sensor system 314 (e.g., where the image data output by the imaging device 304 is an input to the sensor system 314). Moreover, the lane change coordination system 306 may include any number of different subcomponents or subsystems that are configurable to determine whether an automated lane change may be desirable and assign lane priorities. In such implementations, the lane change coordination system 306 arbitrates the outputs from the different subcomponents or subsystems in concert with the driver's visual attention state output from the driver monitoring system 302 and/or the visual lane prioritization module 312 to determine whether to initiate an automated lane change in a manner that accounts for the driver's visual lane preferences as well as any number of other different factors or variables during operation of the vehicle (e.g., route information, lane closures or lane ending, road construction, traffic, detected objects or obstacles, driver preferences or other vehicle settings, and/or the like).

Figure 4:
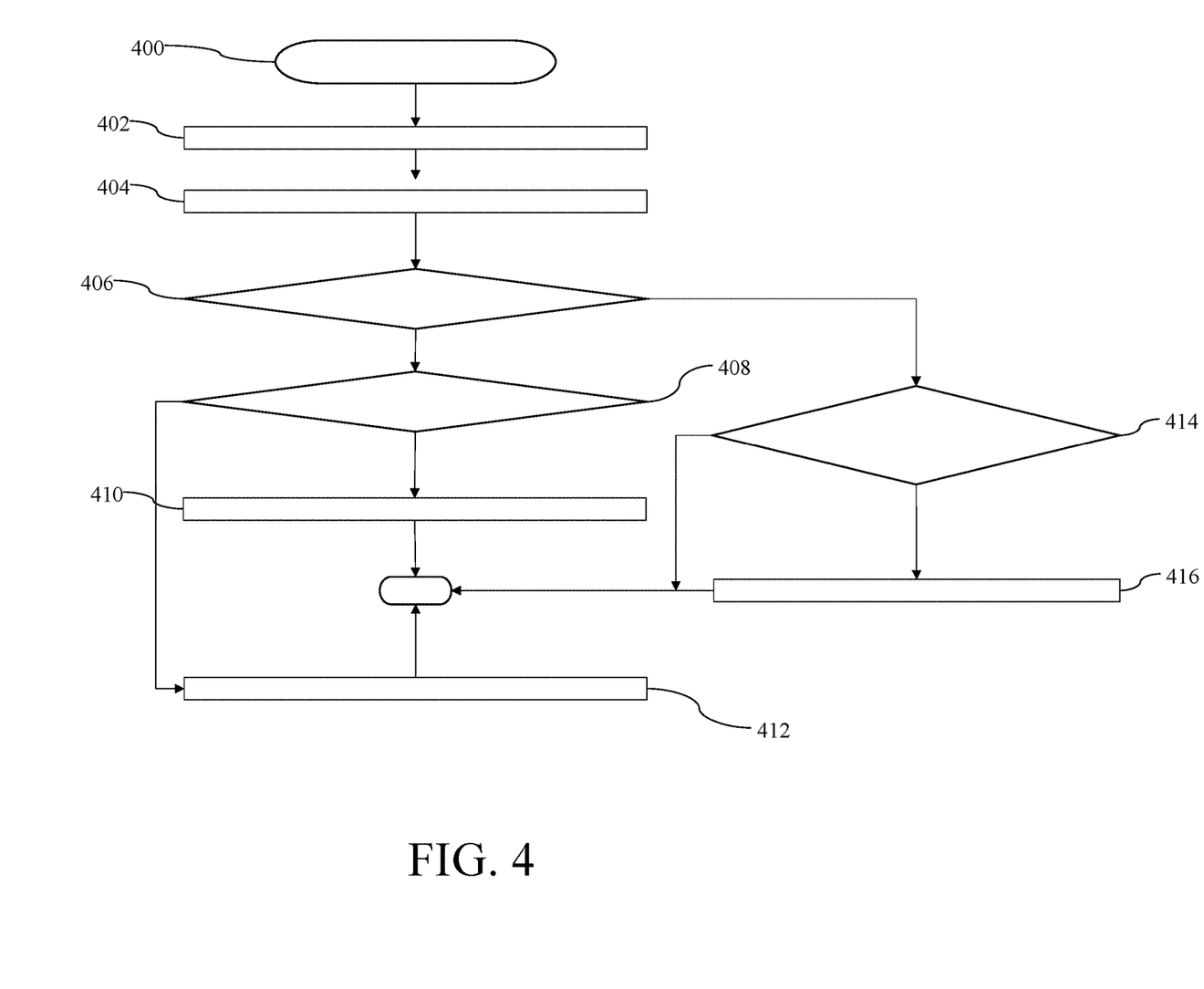
FIG. 4 depicts a flow diagram of a visual lane prioritization process suitable for implementation by the ADS of FIG. 2 in the autonomous vehicle control system of FIG. 1 according to one or more aspects described herein.

FIG. 4 depicts an exemplary implementation of a visual lane prioritization process 400 suitable for implementation by one or more control modules onboard a vehicle (e.g., by the driver monitoring system 302 in conjunction with the ADS 70 supported by the controller 34 in the vehicle 10) to autonomously operate one or more actuators onboard the vehicle to change lanes in a manner that is influenced by the driver's lane preference derived from analysis of the driver's visual attention state. For illustrative purposes, the following description may refer to elements mentioned above in connection with FIGS. 1-3. While portions of the visual lane prioritization process 400 may be performed by different elements of a vehicle system, for purposes of explanation, the subject matter may be primarily described herein in the context of the visual lane prioritization process 400 being primarily performed by the driver monitoring system 302 and the guidance system 78, 308 of the ADS 70 implemented by the controller 34 associated with the vehicle 10.

In exemplary implementations, the visual lane prioritization process 400 begins by identifying or otherwise determining the driver's visual attention state at 402. As described above in the context of FIG. 3, in exemplary implementations, the visual attention classification module 310 of a driver monitoring system 302 continually analyzes the image data output by the imaging device 304 to classify the orientation of the driver's line of sight or focal point relative to the position of the imaging device 304 into a particular visual attention state corresponding to the direction of the driver's visual attention. For example, when the visual attention classification module 310 determines the driver's visual attention is directed towards the driver's side mirror or otherwise further towards the driver's side of the vehicle (e.g., out a driver's side window), the visual attention classification module 310 may classify the driver's visual attention as the adjacent lane on the driver's side of the vehicle. On the other hand, when the visual attention classification module 310 determines driver's visual attention is directed towards the passenger side mirror or otherwise further towards the passenger side of the vehicle (e.g., out a passenger side window), the visual attention classification module 310 may classify the driver's visual attention as the adjacent lane on the passenger side of the vehicle. Similarly, when the visual attention classification module 310 determines driver's visual attention is directed towards the rear-view mirror, the center console, the dashboard, or other regions within the vehicle, the visual attention classification module 310 may classify the driver's visual attention into a corresponding visual attention state associated with that region. In this regard, in some implementations, a particular region may be assigned to a visual attention state for negating, cancelling or otherwise overriding an automated lane change, as described in greater detail below.

After determining the driver's visual attention state, visual lane prioritization process 400 identifies or otherwise determines driver lane preference metrics based on the driver's visual attention state at 404. In exemplary implementations, the visual lane prioritization process 400 identifies or otherwise determines driver lane preference metrics based on the driver's visual attention state over a preceding monitoring window period of time. For example, the visual attention classification module 310 may periodically sample or otherwise analyze the image data from the imaging device 304 and output indicia of the classified visual attention state associated with a respective sampling period. The visual lane prioritization module 312 receives the indication of the current visual attention state and calculates or otherwise determines corresponding metrics indicative of the driver's relative preference for the different potential lanes based on the visual attention state indicia over the preceding monitoring window.

In exemplary implementations, for potential visual attention state corresponding to a particular lane, the visual lane prioritization module 312 may implement a counter or similar feature to count the number of times that the driver's visual attention state corresponded to that particular lane over the preceding monitoring window. For example, the visual lane prioritization module 312 may count the number of times that the driver's visual attention state was classified as being directed to the adjacent lane on the driver's side of the vehicle over the preceding minute, thereby tracking or otherwise monitoring the frequency at which the driver looked towards the driver side lane over the preceding minute of time. Similarly, the visual lane prioritization module 312 may count the number of times that the driver's visual attention state was classified as being directed to the adjacent lane on the passenger side of the vehicle over the preceding minute to track the frequency at which the driver looked towards the passenger side lane over the preceding minute of time. Likewise, in implementations where different regions for the driver's visual attention are classified into a particular visual attention state for the current lane of travel (e.g., when the driver's visual attention is directed towards the front windshield), the visual lane prioritization module 312 may count the number of times that the driver's visual attention state was classified as being directed to the current lane.

In one or more exemplary implementations, the visual lane prioritization module 312 also implements a timer or similar feature to count the duration of time that the driver's visual attention state was maintained unchanged over successive sampling periods while being directed to a particular lane over the preceding monitoring window. For example, when the visual attention classification module 310 classifies the driver's visual attention state as being directed to the adjacent lane on the driver's side of the vehicle over successive samples, the visual lane prioritization module 312 may utilize the relative difference between timestamps of the successive samples to determine a corresponding duration that the driver's visual attention was focused on the driver side lane and increment the cumulative duration that the driver's visual attention was focused on the driver side lane over the preceding monitoring window. In this regard, by tracking or monitoring the duration of time the driver's attention was directed to a particular lane while also tracking or monitoring the frequency or number of times the driver's attention was directed to that particular lane, the resulting metrics for the different potential lanes are indicative of the driver's relative preference for a particular lane of the available potential lanes.

Still referring to FIG. 4, after determining the driver's current visual attention state and corresponding driver lane preference metrics, the visual lane prioritization process 400 identifies or otherwise determines whether an automated lane change is pending for execution at 406, and if so, determines whether the pending automated lane change is in the same direction as the driver's visual attention at 408. In this regard, the lane change coordination system 306 receives indication of the driver's current visual attention state from the driver monitoring system 302 and determines whether the current visual attention state for the driver was classified to an adjacent lane that matches or otherwise corresponds to a pending automated lane change that was determined based on traffic, obstacles, route information and/or the like. When the visual lane prioritization process 400 confirms that the driver's current visual attention state is in the same direction as or otherwise matches the pending automated lane change, the visual lane prioritization process 400 automatically increases the priority associated with that particular lane at 410 to expedite initiation of the automated lane change in that direction or otherwise increase the likelihood of the automated lane change in that direction being executed.

For example, when an automated lane change to the adjacent lane on the driver's side was previously determined by the lane change coordination system 306 in order to overtake slower moving traffic in the path of the vehicle and is pending execution by the guidance system 78, 308 and/or vehicle control system 80, 320 and the driver's current visual attention state is classified as being directed to the driver side lane, the lane change coordination system 306 may automatically increase a priority value associated with the pending lane change and/or the driver side lane to increase the likelihood of the motion planning module of the guidance system 78, 308 determining a corresponding motion plan to change lanes from the current lane of travel into the driver side lane. Additionally, or alternatively, in some implementations, the lane change coordination system 306 may set a flag bit or provide other indication in connection with the automated lane change request provided to the guidance system 78, 308 to indicate that the guidance system 78, 308 should attempt to expedite the pending lane change to the driver side lane. Thus, by virtue of the driver's visual attention being consistent with or otherwise confirming the automated lane change and providing increased confidence in the desirability of the automated lane change, the guidance system 78, 308 and/or vehicle control system 80, 320 may respond to the driver's visual attention state by expediting autonomous operation of the vehicle to change lanes in the direction of the driver's visual attention to behave more consistent with the driver's expectations indicated by the driver's visual attention and thereby improve user experience.

On the other hand, when the visual lane prioritization process 400 determines that the driver's current visual attention state is in a different or opposite direction as the pending automated lane change, the visual lane prioritization process 400 automatically decreases the priority associated with that particular lane at 412 to delay initiation of the automated lane change in that direction or otherwise decrease the likelihood of the automated lane change in that direction being executed. For example, when an automated lane change to the adjacent lane on the driver's side was previously determined by the lane change coordination system 306 in order to overtake slower moving traffic in the path of the vehicle but the driver's current visual attention state is classified as being directed to the passenger side lane on the opposite side of the vehicle, the lane change coordination system 306 may automatically decrease a priority value associated with the pending lane change and/or the driver side lane to decrease the likelihood of the motion planning module of the guidance system 78, 308 determining a corresponding motion plan to change lanes from the current lane of travel into the driver side lane. Additionally, or alternatively, in some implementations, the lane change coordination system 306 may set a flag bit or provide other indication in connection with the automated lane change request provided to the guidance system 78, 308 to indicate that the guidance system 78, 308 should pause or delay the pending lane change to the driver side lane. In yet other implementations, the lane change coordination system 306 may cancel a pending automated lane change request when there is a mismatch between the driver's visual attention state or visual attention direction and the direction of the pending automated lane change. Thus, when the driver's visual attention is inconsistent with an automated lane change and decreasing confidence in the desirability of the automated lane change, the guidance system 78, 308 and/or vehicle control system 80, 320 may respond to the driver's visual attention state by maintaining autonomous operation of the vehicle in the current lane of travel to avoid behaving inconsistently with the driver's expectations indicated by the driver's visual attention, thereby improving user experience.

Still referring to FIG. 4, when there is no automated lane change pending at 406, the visual lane prioritization process 400 analyzes the lane preference metrics determined based on the driver's visual attention state to detect or otherwise identify when the respective value for one or more of the driver's lane preference metrics is greater than a threshold value indicative of a driver lane preference for another lane at 414, and when the driver's lane preference metrics indicate the driver has a preference for another lane, the visual lane prioritization process 400 automatically increases the priority associated with the adjacent lane in the visual attention direction and automatically decreases the priority associated with the adjacent lane in the opposing direction at 416 to expedite initiation of the automated lane change in the driver's preferred direction or otherwise increase the likelihood of the automated lane change in driver's preferred direction. In this regard, the lane preference threshold(s) may be chosen to effectively filter or otherwise ignore transient fluctuations in the driver's visual attention state that may be merely coincidental or inadvertent and unlikely to reflect the driver's preferences or intent. Thus, when the driver's lane preference metrics do not indicate any particular lane preference, the visual lane prioritization process 400 exits and repeats after the next sampling of the image data output by the imaging device 304 to dynamically respond substantially in real-time to the most recently observed visual attention state for the driver.

It should be noted that although the subject matter may be described herein in the context of a mutually inclusive implementation requiring both the frequency and duration of the driver's visual attention being directed in a particular direction to ascertain a lane preference, other implementations may be mutually independent requiring only one of the frequency or the duration of the driver's visual attention being directed in a particular direction by more than the respective threshold in order to assign a lane preference. Moreover, the subject matter is not limited to any particular type, number or combination of visual lane preference metrics and corresponding thresholds that may be utilized to prioritize or otherwise assign relative preferences to different lanes based on the driver's visual attention state.

Still referring to FIG. 4, in exemplary implementations, at 414, the visual lane prioritization module 312 verifies or otherwise confirms that the frequency or number of times that the driver's visual attention state was directed towards an adjacent lane is greater than a threshold number of times during the preceding monitoring window while also verifying or otherwise confirming that the cumulative duration of time that the driver's visual attention state was directed towards that adjacent lane is greater than a threshold duration of time during the preceding monitoring window. In this manner, the visual lane prioritization module 312 infers, based on the driver's visual attention being preferentially focused in a particular direction towards a particular adjacent lane, that the driver is more likely to prefer travel in that adjacent lane and/or that the driver has greater situational awareness with respect to that adjacent lane to improve safety and user experience when an automated lane change in that direction is initiated.

For example, when the driver has looked towards the adjacent lane on the passenger side more than a threshold number of times during the preceding minute for greater than a threshold duration, the visual lane prioritization module 312 may determine that the driver prefers to change lanes to the passenger side and provide a corresponding indication to the lane change coordination system 306 to increase the priority associated with the passenger side (and decrease the priority associated with the driver side). As a result, when a request for an automated lane change is subsequently generated (e.g., by an overtake assessor determining a lane change should be performed to pass slower moving in-path traffic), the lane change coordination system 306 may utilize the increased priority associated with the passenger side to cause the automated lane change to be to the passenger side rather than the driver side of the vehicle and/or expedite the automated lane change to the passenger side. In this manner, by accounting for the driver's previously observed visual attention state when prioritizing potential lanes of travel relative to one another, the visual lane prioritization process 400 reduces the likelihood of a mismatch between a subsequent automated lane change and the driver's visual attention state at 408.

Still referring to FIG. 4, in exemplary implementations, the visual lane prioritization process 400 repeats in response to each updated sampling of image data from the imaging device 304 to continually analyze the driver's visual attention state to dynamically update and adapt the relative priorities or preferences associated with the different potential lanes of travel to reflect the driver's most recently observed visual attention over the preceding monitoring window. In this manner, the direction of automated lane changes may more intuitively track the driver's expectations and accord with the driver's situational awareness with respect to the destination lane for an automated lane change by prioritizing the direction most aligned with the driver's visual attention. Moreover, by deprioritizing or delaying automated lane changes away from the driver's visual attention, the visual lane prioritization process 400 reduces the likelihood of a driver manually interacting to override or cancel an automated lane change.

Some implementations of the visual lane prioritization process 400 may allow the driver to effectively cancel or negate an automated lane change visually by maintaining his or her gaze in another direction that delays the automated lane change and/or deprioritizes the destination lane for that automated lane change until the automated lane change is no longer desired by the guidance system 78, 308 and/or the lane change coordination system 306. In this regard, in some implementations, an automated lane change cancellation region may be defined (e.g., a particular region of the dashboard) such that when the driver's line of sight or focal point is within the automated lane change cancellation region and the driver's visual attention state is classified as the automated lane change cancellation state, the visual lane prioritization module 312 and/or the lane change coordination system 306 may automatically override and cancel an automated lane change, thereby allowing a driver to effectively provide a visual input to cancel an automated lane change without requiring another manual or physical input (e.g., actuating a turn signal stalk in an opposing direction).

Additionally, in some implementations, the visual lane prioritization process 400 may be configured to support a particular sequence of driver visual attention states that corresponds to a predefined pattern for initiating or expediting an automated lane change. In this regard, the driver monitoring system 302 may be configured to detect or otherwise identify when a particular sequence of driver visual attention states corresponding to a predefined pattern for an automated lane change in a particular direction and, in response, provide corresponding indicia to the lane change coordination system 306 to increase priority or preference for that particular direction to initiate or expedite the desired lane change. For example, a sequence of driver visual attention states of passenger side mirror followed by center console followed passenger side mirror may be designated or otherwise assigned to a lane change on demand to the passenger side, where in response to detecting that sequence of driver visual attention states, the driver monitoring system 302 provides corresponding indicia to the lane change coordination system 306 that causes the guidance system 78, 308 to automatically initiate the desired lane change from the current lane of travel to the adjacent lane on the passenger side of the vehicle. It should be appreciated that there are numerous different potential sequences or patterns that may be assigned to particular actions or operations by the vehicle, and the subject matter described herein is not intended to be limited to any particular pattern or sequence.

Figure 5:
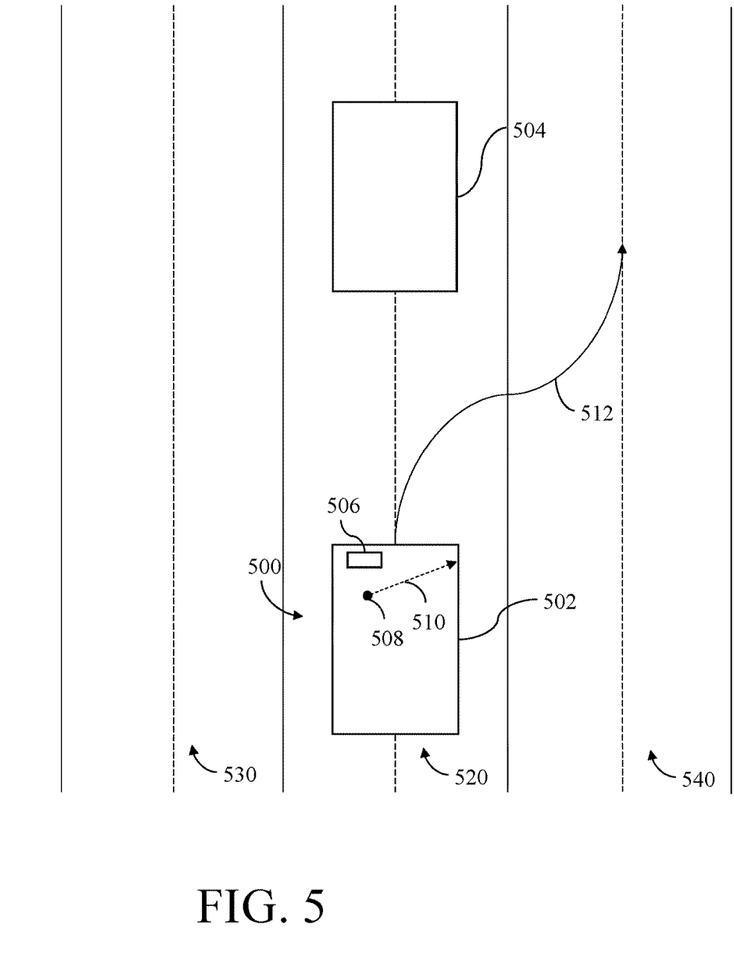
FIGS. 5-6 depict exemplary scenarios for example implementations of the visual lane prioritization process of FIG. 4 according to one or more aspects described herein.

FIG. 5 depicts an exemplary scenario illustrating the visual lane prioritization process 400 of FIG. 4 in accordance with one or more implementations. FIG. 5 depicts an initial state 500 of a vehicle 502 (e.g., vehicle 10) traveling behind another vehicle 504 in the center lane 520 of a road while being operated in an autonomous cruise control mode or other Level Two autonomous operating mode that attempts to maintain the vehicle 502 substantially centered within the current lane 520 of travel along the lane centerline at a user-defined velocity, subject to other user-defined or user-configurable constraints (e.g., separation distances from other vehicles and the like). As described above in the context of FIG. 3, the vehicle 502 includes an imaging device 506 (e.g., imaging device 304) inside the passenger compartment that is oriented towards a position 508 of a driver of the vehicle 502 to capture video or other imagery of the driver seated at that position 508 that is capable of being analyzed (e.g., by the visual attention classification module 310 at 402) to classify the driver's visual attention state, for example, by capturing video or other imagery of the driver's face or eyes that can be utilized to identify the relative orientation or direction of the driver's line of sight 510. In this regard, FIG. 5 depicts a scenario where the driver's visual attention state is classified as being directed towards the adjacent lane 540 to the passenger side (or right side) of the vehicle 502 by virtue of the driver's line of sight 510 being oriented towards the passenger side mirror or otherwise out the passenger side window.

At the initial state 500, the sensor system 74, 314 onboard the vehicle 10, 502 captures or otherwise obtains sensor data associated with the other vehicle 504 that is within the current lane 520 of travel and the guidance system 78, 308 (or an overtake assessor associated therewith) determines, based on the distance between the vehicles 502, 504 and the current speed of the host vehicle 502 relative to the in-path vehicle 504, that an automated lane change should be performed to allow the host vehicle 502 to pass the other vehicle 504. Based on the driver's visual attention state being classified as being directed to the passenger side lane 540, the visual lane prioritization module 312 and/or the lane change coordination system 306 may increase the priority associated with the passenger side lane 540 to expedite the guidance system 78, 308 determining a corresponding motion plan (indicated by trajectory 512) to initiate and autonomously execute an automated lane change from the current lane 520 of travel towards the right to the adjacent passenger side lane 540. In this regard, by virtue of the visual lane prioritization process 400 of FIG. 4 accounting for the driver's visual attention being directed towards the passenger side lane 540 by increasing the priority associated with the passenger side lane 540 and/or decreasing the priority associated with the driver side lane 530, the automated lane change may be performed to the passenger side lane 540 to align with the driver's visual attention direction (indicated by line of sight 510) where the driver is likely to have greater situational awareness to better comport with the driver's expectations rather than defaulting to an automated lane change to the driver side lane 530 in order to overtake the in-path vehicle 504 without accounting for the driver's visual attention.

Figure 6:
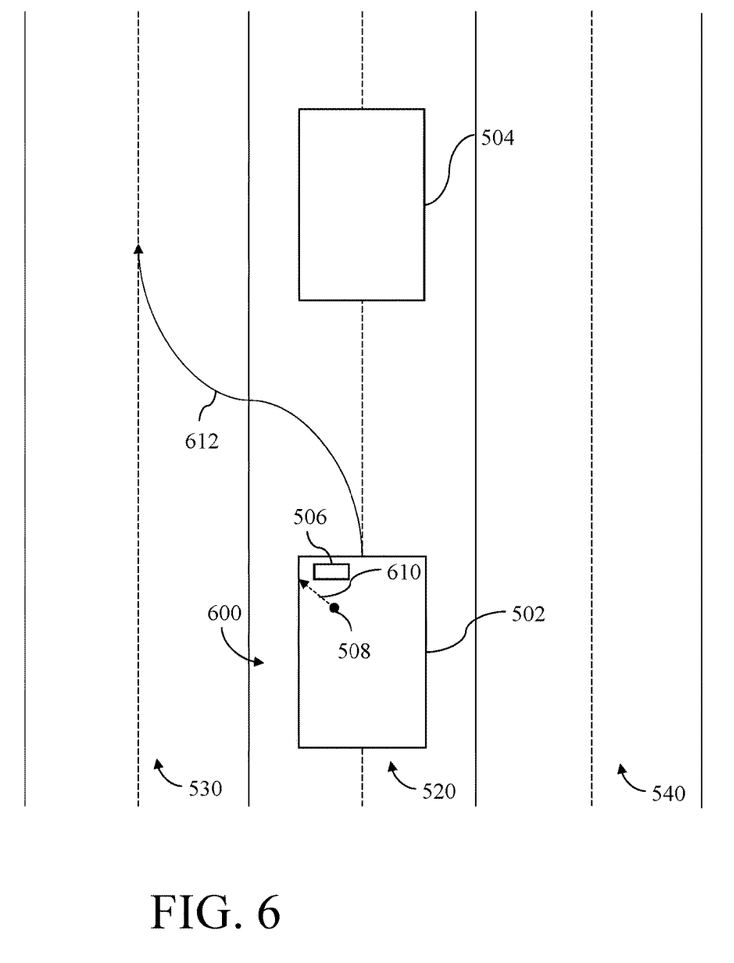

FIG. 6 depicts an exemplary scenario illustrating the visual lane prioritization process 400 of FIG. 4 in accordance with one or more implementations. FIG. 6 depicts an initial state 600 of a vehicle 502 (e.g., vehicle 10) traveling behind another vehicle 504 in the center lane 520 of a road while being operated in an autonomous cruise control mode or other Level Two autonomous operating mode that attempts to maintain the vehicle 502 substantially centered within the current lane 520 of travel along the lane centerline at a user-defined velocity, subject to other user-defined or user-configurable constraints (e.g., separation distances from other vehicles and the like). In this regard, FIG. 6 depicts a scenario where the driver's visual attention state is classified as being directed towards the adjacent lane 530 to the driver side of the vehicle 502 by virtue of the driver's line of sight 610 being oriented towards the driver side mirror or otherwise out the driver side window.

In the scenario of FIG. 6, the guidance system 78, 308 (or an overtake assessor associated therewith) may determine, based on the distance between the vehicles 502, 504 and the current speed of the host vehicle 502 relative to the in-path vehicle 504, that an automated lane change does not need to be performed at the current point in time. However, based on the driver's visual attention being directed towards the driver side lane 530 with sufficient frequency and duration of time (e.g., at 414), the visual lane prioritization module 312 and/or the lane change coordination system 306 may increase the priority associated with the driver side lane 530 to expedite the guidance system 78, 308 determining a corresponding motion plan (indicated by trajectory 612) to initiate and autonomously execute an automated lane change from the current lane 520 of travel towards the left to the adjacent driver side lane 530. In this regard, by virtue of the visual lane prioritization process 400 accounting for the driver's visual attention and increasing the priority associated with the driver side lane 530, rather than waiting for the host vehicle 502 to continue reducing the buffer distance between the in-path vehicle 504 until the overtake assessor or another component of the guidance system 78, 308 requests an automated lane change, an automated lane change may be expedited and performed preemptively (e.g., once the priority associated with the driver side lane 530 exceeds a threshold value or exceeds a priority assigned to the current lane 520) to align with the driver's visual attention indicating a likely desire or expectation by the driver that the vehicle 502 will autonomously change lanes to overtake the vehicle 504. Thus, by allowing a driver to effectively provide a visual input to initiate an automated lane change, the driver does not need to provide a manual or physical input (e.g., actuating a turn signal stalk) to manually initiate a lane change on demand.

Referring again to FIGS. 1-4, in one or more implementations, the vehicle control system 300 and the visual lane prioritization process 400 may be cooperatively configured to support self-learning to provide personalized, driver-specific automated lane change behavior by adjusting thresholds for initiating automated lane changes in a manner that incorporates the driver's visual attention state as well as the driver's other interactions with the system to initiate or cancel automated lane changes. For example, when a driver cancels an automated lane change, either by physical interaction with the system (e.g., by actuating the turn signal stalk) or visual cancelation or override, the lane change coordination system 306 and/or the visual lane prioritization module 312 may automatically increase the threshold(s) used at 414 to decrease the sensitivity of the visual lane prioritization process 400 and require more frequent and/or more prolonged visual attention to a particular side of the vehicle before initiating or expediting an automated lane change to that side. Conversely, when a driver manually initiates a lane change on demand via physical interaction with the system, the lane change coordination system 306 and/or the visual lane prioritization module 312 may automatically decrease the threshold(s) used at 414 to increase the sensitivity of the visual lane prioritization process 400 and require less frequent and/or less prolonged visual attention to a particular side of the vehicle before initiating or expediting an automated lane change to that side. Thus, over time, the thresholds may adapt in a user-specific manner to achieve more intuitive automated lane change behavior that comports with each individual driver's driving or ride preferences while reducing the amount of physical or other manual interaction, thereby improving the user experience.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of controlling a vehicle in an autonomous operating mode, the method comprising:
   classifying, by a controller associated with the vehicle, an orientation of a line of sight of a driver of the vehicle into a visual attention state of a plurality of different visual attention states based at least in part on image data output of an imaging device onboard the vehicle indicative of visual attention of the driver directed to a region associated with a side of a current lane of travel in a visual attention direction;
   determining, by the controller based at least in part on the visual attention state, a driver lane preference corresponding to an adjacent lane on the side of the current lane of travel in the visual attention direction relative to the current lane of travel for the vehicle;
   increasing, by the controller, a priority associated with the adjacent lane corresponding to the driver lane preference, resulting in an increased priority associated with the adjacent lane; and
   autonomously operating, by the controller, one or more actuators onboard the vehicle to initiate a lane change from the current lane to the adjacent lane in a manner that is influenced by the increased priority associated with the adjacent lane.

2. The method of claim 1, wherein autonomously operating the one or more actuators to initiate the lane change from the current lane to the adjacent lane in accordance with the increased priority comprises providing an indication to a motion planning module to generate a motion plan to execute a pending lane change in the visual attention direction.

3. The method of claim 1, further comprising:
   decreasing the priority associated with a second adjacent lane on a second side of the current lane opposite the side of the current lane corresponding to the adjacent lane, resulting in a decreased priority associated with the adjacent lane; and
   autonomously operating the one or more actuators comprises autonomously operating the one or more actuators to delay a second lane change from the current lane to the second adjacent lane in accordance with the decreased priority.

4. The method of claim 1, wherein autonomously operating the one or more actuators comprises autonomously operating the one or more actuators to cancel or delay a pending lane change to a second adjacent lane on a second side of the current lane opposite the side of the current lane corresponding to the adjacent lane.

5. The method of claim 1, wherein:
   classifying the orientation of the line of sight of the driver of the vehicle into the visual attention state comprises determining at least one of a frequency and a duration of visual attention in the visual attention direction over a preceding window of time; and determining the driver lane preference comprises determining the adjacent lane is a preferred lane when the at least one of the at least one of the frequency and the duration of visual attention in the visual attention direction over the preceding window of time is greater than a threshold.

6. The method of claim 1, wherein autonomously operating the one or more actuators comprises autonomously executing an automated lane change from the current lane to the adjacent lane based on a current speed of the vehicle relative to an in-path vehicle.

7. The method of claim 1, wherein autonomously operating the one or more actuators comprises autonomously initiating an automated lane change from the current lane to the adjacent lane preemptively rather than reducing a buffer distance to an in-path vehicle.

8. The method of claim 1, wherein increasing the priority comprises providing an indication to expedite a pending lane change to the adjacent lane.

9. The method of claim 1, wherein the imaging device comprises a video camera integrated into a steering wheel of the vehicle.

10. The method of claim 1, wherein autonomously operating the one or more actuators comprises overriding an automated lane change to a different lane on an opposite side of the vehicle.

11. The method of claim 1, wherein increasing the priority comprises decreasing at least one of a timer or a threshold for initiating the lane change to the adjacent lane.

12. A vehicle comprising:
an imaging device;
one or more actuators onboard the vehicle; and
a controller coupled to the imaging device and the one or more actuators that, by a processor, identifies a visual attention state associated with a driver of the vehicle based at least in part on output of the imaging device indicative of visual attention of the driver directed to a region associated with a side of a current lane of travel in a visual attention direction by classifying an orientation of a line of sight of the driver into the visual attention state of a plurality of different visual attention states, determines a driver lane preference corresponding to an adjacent lane on the side of the current lane of travel in the visual attention direction relative to the current lane of travel for the vehicle corresponding to the visual attention state, increase a priority associated with the adjacent lane corresponding to the driver lane preference, resulting in an increased priority associated with the adjacent lane, and autonomously operates the one or more actuators to initiate maneuvering the vehicle from the current lane to the adjacent lane in a manner that is influenced by the increased priority associated with the adjacent lane.

13. The vehicle of claim 12, wherein the imaging device comprises a camera oriented to capture imagery of the driver when the driver is operating the vehicle.

14. The vehicle of claim 12, wherein the region comprises a mirror on the side of the vehicle in the visual attention direction.

15. A non-transitory computer-readable medium comprising executable instructions that, when executed by a processor, cause the processor to:
classify an orientation of a line of sight of a driver of a vehicle into a visual attention state of a plurality of different visual attention states based at least in part on image data output of an imaging device onboard the vehicle indicative of visual attention of the driver directed to a region associated with a side of a current lane of travel in a visual attention direction;
determine, based at least in part on the visual attention state, a driver lane preference corresponding to an adjacent lane on the side of the current lane of travel in the visual attention direction relative to the current lane of travel for the vehicle;
increase a priority associated with the adjacent lane corresponding to the driver lane preference, resulting in an increased priority associated with the adjacent lane; and
autonomously operate one or more actuators onboard the vehicle to initiate a lane change from the current lane to the adjacent lane in a manner that is influenced by the increased priority associated with the adjacent lane.

16. The non-transitory computer-readable medium of claim 15, wherein the region comprises a mirror on the side of the vehicle in the visual attention direction.

17. The non-transitory computer-readable medium of claim 15, wherein autonomously operating the one or more actuators comprises providing an indication to a motion planning module to generate a motion plan to execute a pending lane change in the visual attention direction.

18. The non-transitory computer-readable medium of claim 15, wherein the executable instructions cause the processor to:
decrease the priority associated with a second adjacent lane when the visual attention direction corresponds to the side of the current lane opposite a second side of the current lane corresponding to the second adjacent lane, resulting in a decreased priority associated with the second adjacent lane; and
delay a second lane change from the current lane to the second adjacent lane in accordance with the decreased priority.

19. The non-transitory computer-readable medium of claim 15, wherein autonomously operating the one or more actuators comprises autonomously operating the one or more actuators to cancel or delay a pending lane change.

20. The non-transitory computer-readable medium of claim 15, wherein determining the driver lane preference comprises:
determining at least one of a frequency and a duration of visual attention in the visual attention direction over a preceding window of time; and
determining the adjacent lane is a preferred lane when the at least one of the at least one of the frequency and the duration of visual attention in the visual attention direction over the preceding window of time is greater than a threshold.

* * * * *